(12) United States Patent
Lewis et al.

(10) Patent No.: US 6,427,252 B1
(45) Date of Patent: Aug. 6, 2002

(54) HARNESS-SUSPENDERS COMBINATION

(75) Inventors: Patricia Lewis, Huber Heights; William L. Grilliot; Mary I. Grilliot, both of Dayton, all of OH (US)

(73) Assignee: Morning Pride Manufacturing, L.L.C., Dayton, OH (US)

(*) Notice: Subject to any disclaimer, the term of this patent is extended or adjusted under 35 U.S.C. 154(b) by 39 days.

(21) Appl. No.: 09/667,143

(22) Filed: Sep. 21, 2000

(51) Int. Cl.⁷ .......................... A41F 15/00; B64D 17/30
(52) U.S. Cl. ................... 2/326; 182/3; 244/151 R
(58) Field of Search .................. 2/69, 69.5, 79, 2/310, 44, 45, 94, 456, 311–318, 327, 326; 182/3–6; 244/143, 151 R

(56) References Cited

U.S. PATENT DOCUMENTS

| | | |
|---|---|---|
| 1,849,628 A | 3/1932 | Lemercier |
| 2,342,420 A | 2/1944 | Miner |
| 2,709,667 A | 5/1955 | Grubb et al. |
| 2,887,286 A | 5/1959 | Moran |
| 2,979,153 A | 4/1961 | Hoagland et al. |
| 3,176,793 A | 4/1965 | Hlacia |
| 4,076,101 A | 2/1978 | Himmelrich |
| 4,302,847 A | 12/1981 | Miles |
| 4,608,716 A | 9/1986 | Brumfield |
| 4,625,335 A | 12/1986 | Vinai |
| 4,731,882 A | 3/1988 | Ekman |
| 5,220,976 A | 6/1993 | Gunter |
| 5,289,590 A | 3/1994 | Larson |
| 5,319,806 A * | 6/1994 | Hermann et al. ............ 2/456 |
| 5,386,593 A * | 2/1995 | Kleinman ................ 2/322 |
| 5,448,779 A * | 9/1995 | Aldridge ................ 2/326 |
| 5,531,292 A * | 7/1996 | Bell ...................... 182/3 |
| D379,110 S | 5/1997 | Neustater et al. |
| 5,960,480 A | 10/1999 | Neustater et al. |
| 6,128,782 A * | 10/2000 | Young et al. ............... 2/69 |

* cited by examiner

Primary Examiner—John J. Calvert
Assistant Examiner—Tejash Patel
(74) Attorney, Agent, or Firm—Rockey, Milnamow & Katz, Ltd.

(57) ABSTRACT

Having shoulder straps that pass over a wearer's shoulders when it is worn, a harness of a type that complies with National Fire Protection Association 1983 Standard 4-3.1.3, is combined with suspenders, which are attached to the shoulder straps and which include front suspenders on each side of the harness and back suspenders on each side of the harness.

7 Claims, 5 Drawing Sheets

HARNESS-SUSPENDERS COMBINATION

TECHNICAL FIELD OF THE INVENTION

This invention pertains generally to gear for a firefighter requiring a harness or for another wearer requiring a harness. This invention pertains specifically to a combination comprising a harness, which has shoulder straps that pass over the wearer's shoulders when the harness is worn, and suspenders, which are attached to the shoulder straps.

BACKGROUND OF THE INVENTION

National Fire Protection Association 1983 Standard 4-3.1.3 provides as follows:

4-3.1.3 Harness that fastens around waist, around thighs, or under buttocks, and over shoulders, and designed for rescue with a design load of 267 daN (600 lbf) shall be designated as Class III life safety harness. Class III life safety harness shall be permitted to consist of one or more parts.

National Fire Protection Association 1983 Standard 4-3.1.3 is understood to cover a harness that fastens across a front portion of a wearer's waist, around the wearer's thighs or under the wearer's buttocks, and over the wearer's shoulders, if the harness is designed for rescue with the indicated load.

Commonly, a firefighter requiring a harness having shoulder straps that pass over the firefighter's shoulders, such as a harness complying with National Fire Protection Association 1983 Standard 4-3.1.3, also requires suspenders to hold up bunker pants.

With gear known heretofore, a firefighter wearer may be thus required to don, wear, and doff not only a harness having shoulder straps that pass over the firefighter's shoulders but also suspenders having having shoulder straps that pass over the firefighter's shoulders. Plural straps passing over each shoulder are cumbersome, uncomfortable, and difficult to don, wear, and doff.

SUMMARY OF THE INVENTION

This invention provides a novel combination comprising a harness, which has shoulder straps that pass over the wearer's shoulders when the harness is worn, and suspenders, which are attached to the shoulder straps. The harness may fasten also around the wearer's thighs or under the wearer's buttocks. Preferably, the harness complies with National Fire Protection Association 1983 Standard 4-3.1.3, as discussed above.

The novel combination provided by this invention may be advantageously worn not only by a firefighter but also by a forestry worker, a construction worker, a stage rigger, or any other worker requiring such a harness and requiring suspenders.

Hereinbefore and hereinafter, directional terms, such as front, back, and side, are taken from a standpoint of a wearer.

DETAILED DESCRIPTION OF THE ILLUSTRATED EMBODIMENT

Figure 1:
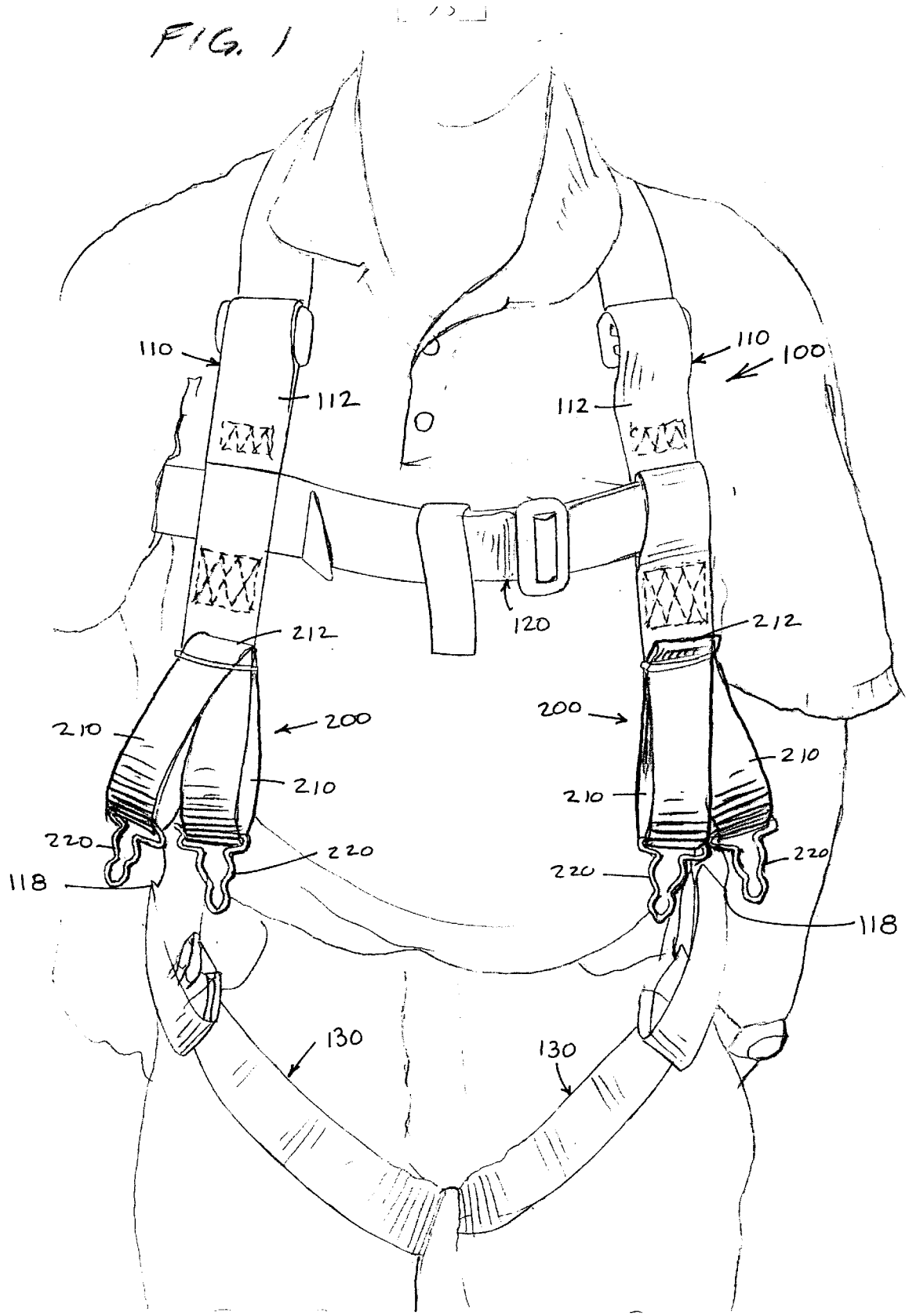
FIG. 1, from a front vantage.
Figure 2:
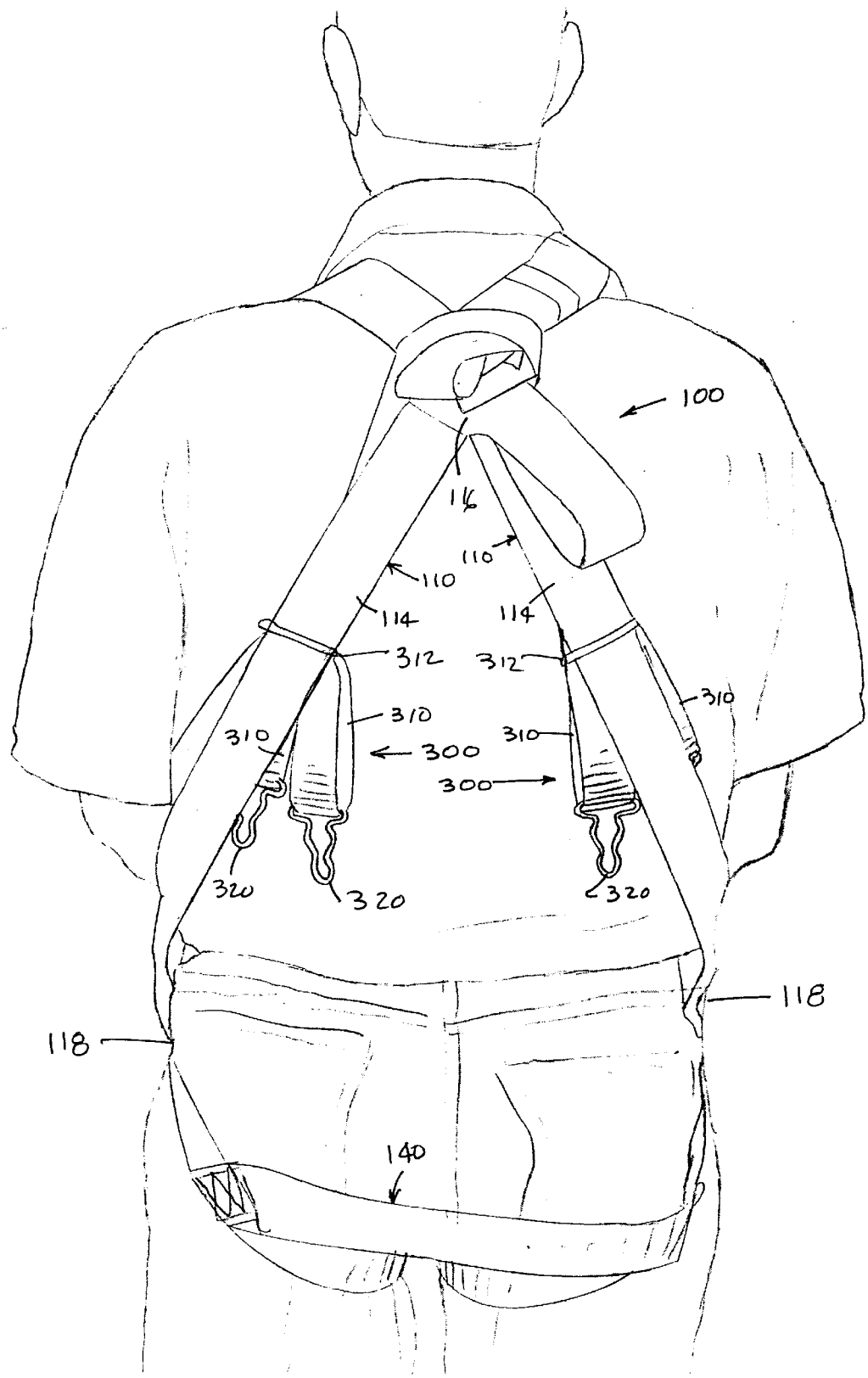
FIG. 2, from a back vantage, are perspective views of a firefighter wearing a pair of inner pants and wearing a harness-suspenders combination, which embodies this invention.
Figure 3:
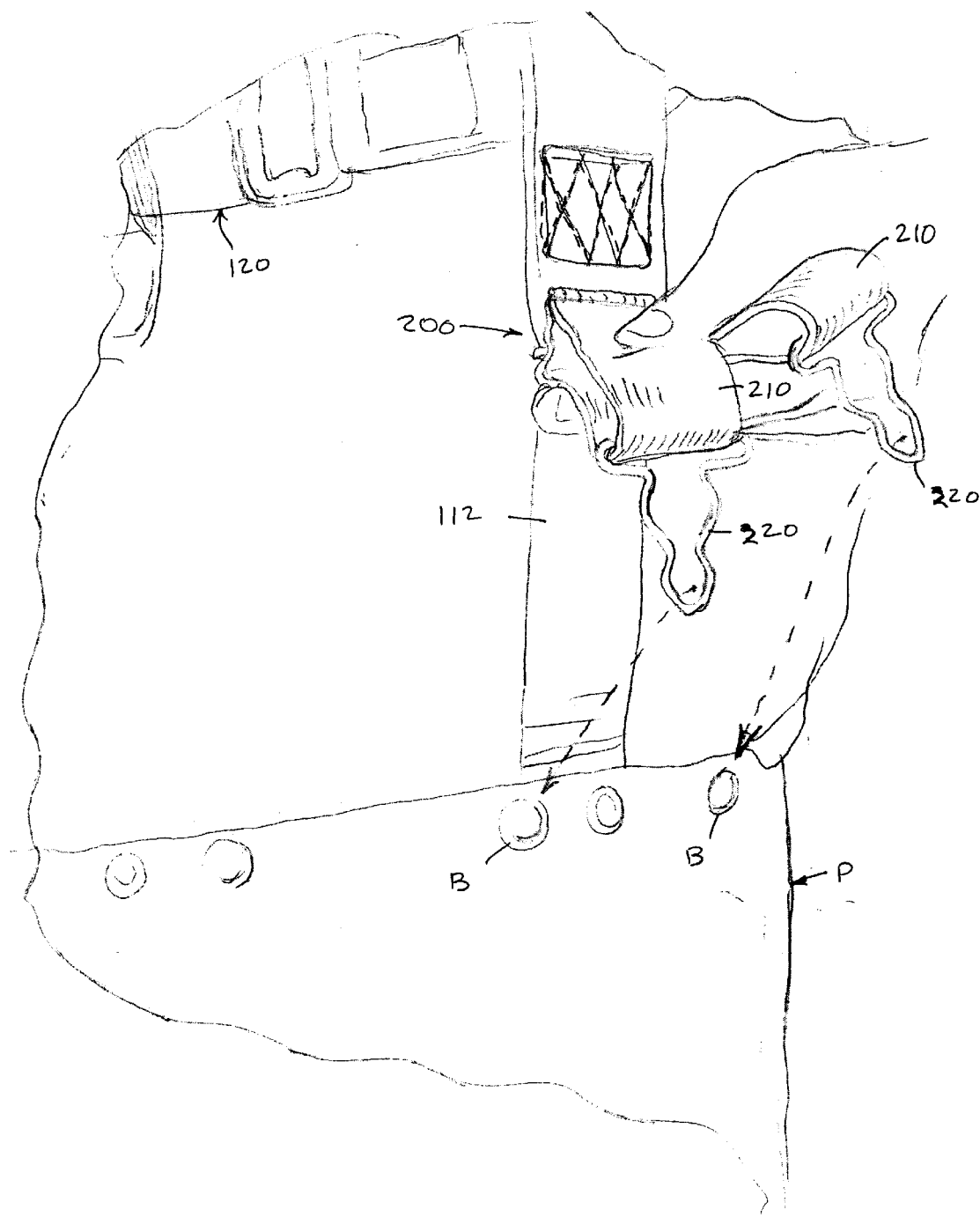
FIG. 3, on an enlarged scale, is a perspective view of two suspender straps included in the harness-suspenders combination and provided with wire loops, which are about to coact with two associated buttons on a pair of bunker pants, as seen from a front vantage.
Figure 4:
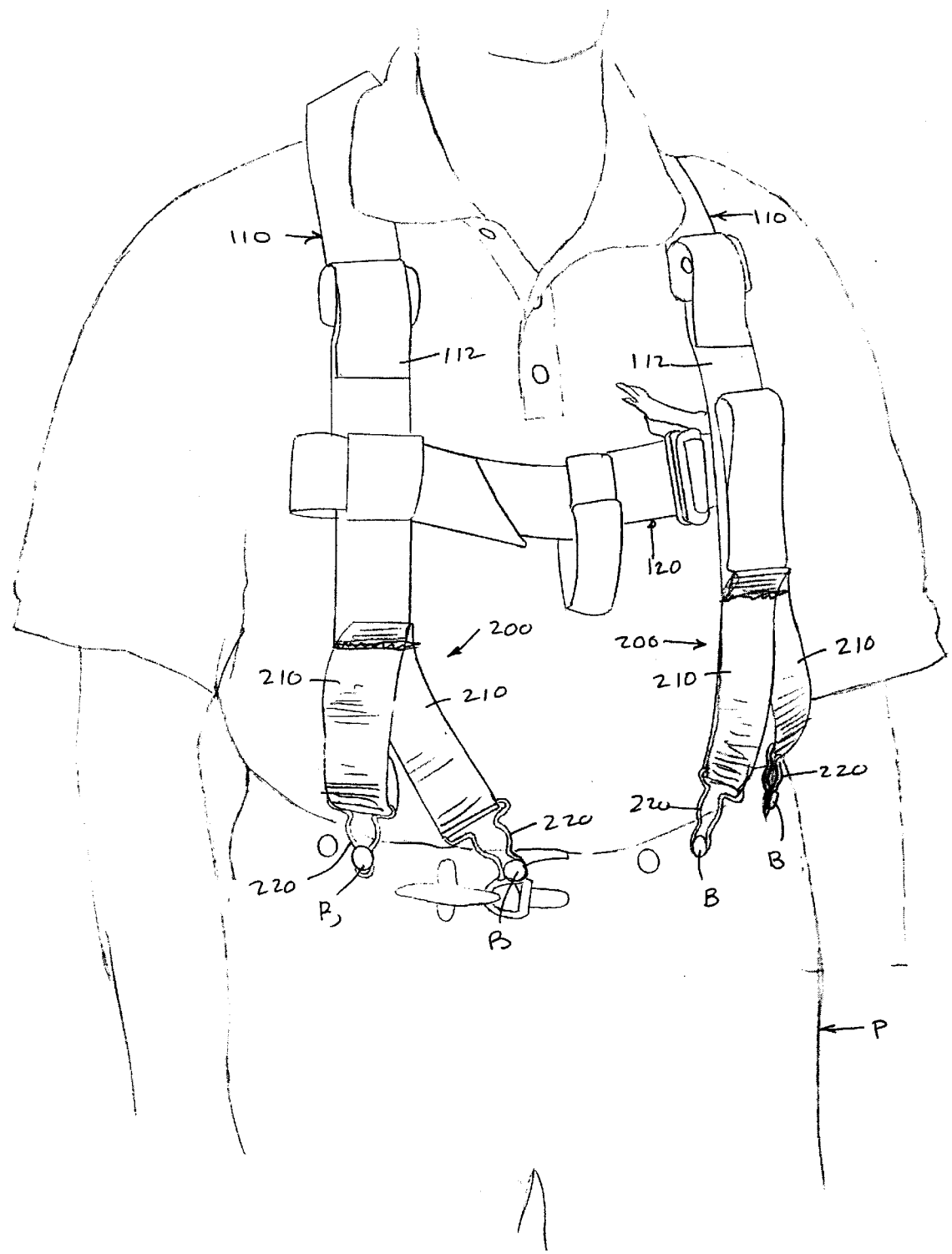
FIG. 4, from a front vantage.
Figure 5:
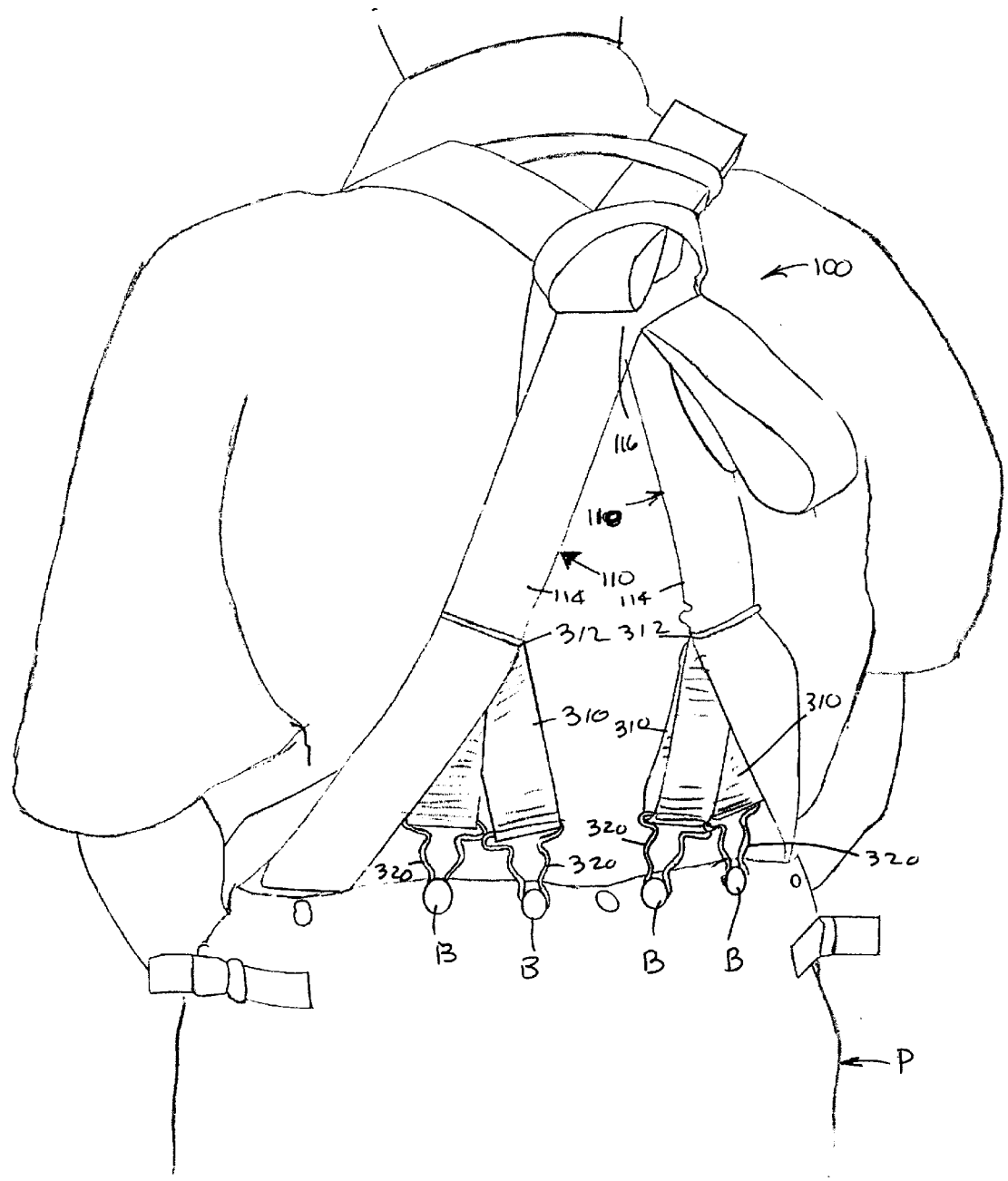
FIG. 5, from a back vantage, are perspective views of the firefighter wearing the pair of bunker pants, over the pair of inner pants, and wearing the harness-suspenders with each suspender strap coacting with an associated button on the pair of bunker pants.

As shown in the drawings, a harness 100 of a type that complies with complies with National Fire Protection Association 1983 Standard 4-3.1.3, as discussed above, is combined with front suspenders 200 on each side of the harness and with back suspenders 300 on each side of the harness 100. Except for such suspenders 200, 300, which have been added pursuant to this invention, such a harness is available commercially from Troll Safety and Rescue of Laramie, Wyo.

National Fire Protection Association 1983 Standard 4-3, which includes National Fire Protection Association 1983 Standard 4-3.1.3, provides (with footnotes omitted) as follows:

4-3 Life Safety Harness System Component.

4-3.1 Life safety harness shall be designed and designated in accordance with one of the following classes.

4-3.1.1 Harness that fastens around waist and around thighs or under buttocks and designed to be used for emergency escape with a design load of 133 daN (300 lbf) shall be designated as Class I life safety harness.

4-3.1.2 Harness that fastens around waist and around thighs or under buttocks and designed for rescue with a design load of 267 daN (600 lbf) shall be designated as Class II life safety harness.

4-3.1.3 Harness that fastens around waist, around thighs, or under buttocks, and over shoulders, and designed for rescue with a design load of 267 daN (600 lbf) shall be designated as Class III life safety harness. Class III life safety harness shall be permitted to consist of one or more parts.

4-3.2* Life safety harness shall be permitted to be adjustable within a range of sizes, provided in a range of sizes, or custom-fitted for individuals.

4-3.3* Load bearing textile materials used in the construction of life safety harness shall be made from virgin, synthetic, continuous filament fiber.

4-3.4* All webbing ends shall be secured by heat sealing or by another method that prevents unraveling.

4-3.5* All thread utilized in the construction of life safety harness shall be compatible with the webbing used and shall allow for ease of inspection by the unaided eye with 20/20 vision, or vision corrected to 20/20, at a nominal distance of 30 cm (12 in.). All stitching breaks or ends shall be backtacked not less than 13 mm (½ in.).

4-3.6 Life safety harness shall have at least one load bearing attachment point located at the front waist or sternal location of the harness.

As shown in the drawings, the harness 100 has two shoulder straps 110, which fasten over a wearer's shoulders when the harness 100 is worn. Each shoulder strap 110 has a front portion 112 and a back portion 114. The back portions 114 cross each other and are attached to each other at a back attachment 116. The front portion 112 of each shoulder strap 110 is attached to the back portion 114 of the other shoulder strap 110 at a side attachment 118.

Moreover, the harness 110 has a waist strap 120, which fastens across a front portion of the wearer's waist when the harness 100 is worn, two thigh straps 130, which fasten around the wearer's thighs when the harness 110 is worn, and a buttocks strap 140, which fastens under the wearer's buttocks when the harness 110 is worn. The waist strap 120 is attached to and extends between the front portions 112 of the shoulder straps 110. Each thigh strap 130 is attached to the shoulder straps 110 at one of the side attachments 118. The buttocks strap 140 is attached to and extends between the thigh straps 130.

On each side of the harness 100, the front suspenders 200 comprise two looped straps 210, each of which is attached at its ends 212 to the front portion 112 of one of the shoulder straps 110 and each of which is looped through a wire ring 220 that is shaped so as to coact with a button B on a pair of bunker pants P. On each side of the harness 100, the back suspenders 300 comprise two looped straps 310, each of which is attached at its ends 312 to the back portion 114 of one of the shoulder straps 110 and each of which is looped through a wire ring 320 that is shaped so as to coact with a button B on a pair of bunker pants P. The wire rings 220, 320, are conventional.

Because the suspenders 200, 300, are attached to the shoulder straps 110 of the harness 100, the wearer does not have plural straps passing over each shoulder. Thus, as contrasted with gear known heretofore, the harness-suspenders combination provided by this invention is easier to don, wear, and doff.

What is claimed is:

1. A combination comprising a harness of a type that fastens over the wearer's shoulders, the harness having shoulder straps that pass over the wearer's shoulders when the harness is worn, and suspenders having upper ends attached to the shoulder straps and lower ends provided with means for fastening the suspenders defined by front and back suspenders on each side of the harness, to a pair of pants worn by the wearer.

2. A combination comprising a harness of a type that fastens around the wearer's thighs or under the wearer's buttocks, and over the wearer's shoulders, the harness having shoulder straps that pass over the wearer's shoulders when the harness is worn, and suspenders having upper ends attached to the shoulder straps and lower ends provided with means for fastening the suspenders defined by front and back suspenders on each side of the harness, to a pair of pants worn by the wearer.

3. A combination comprising a harness of a type that complies with National Fire Protection Association 1983 Standard 4-3.1.3, the harness having shoulder straps that pass over a wearer's shoulders when the harness is worn, and suspenders having upper ends attached to the shoulder straps and lower ends provided with means for fastening the suspenders defined by front and back suspenders on each side of the harness, to a pair of pants worn by the wearer.

4. A combination comprising a harness having shoulder straps that pass over the wearer's shoulders when the harness is worn and suspenders having upper ends attached to the shoulder straps and lower ends provided with means for fastening the suspenders defined by front and back suspenders on each side of the harness, to a pair of pants worn by the wearer.

5. The combination of claim 1, 2, 3, or 4 wherein the means for fastening to pants worn by the wearer comprise wire rings that fasten to buttons on pants worn by the wearer.

6. The combination of claim 5 wherein the suspenders include front suspenders on each side of the harness.

7. The combination of claim 5 wherein the suspenders include back suspenders on each side of the harness.

* * * * *